US008537996B2

(12) United States Patent
Takeyama et al.

(10) Patent No.: US 8,537,996 B2
(45) Date of Patent: Sep. 17, 2013

(54) SELECTIVE RESPONSE UNIT

(75) Inventors: Yasuko Takeyama, Zushi (JP); Hiroaki Miyata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 155 days.

(21) Appl. No.: 12/954,078

(22) Filed: Nov. 24, 2010

(65) Prior Publication Data

US 2011/0129078 A1 Jun. 2, 2011

(30) Foreign Application Priority Data

Nov. 27, 2009 (JP) .................................. 2009-270292

(51) Int. Cl.
H04M 3/42 (2006.01)
(52) U.S. Cl.
USPC ................................................... 379/201.02
(58) Field of Classification Search
USPC ................................................... 379/201.02
See application file for complete search history.

(56) References Cited

U.S. PATENT DOCUMENTS

| 7,899,000 B2 * | 3/2011 | Sukegawa et al. | ............ 370/315 |
| 2003/0020760 A1 * | 1/2003 | Takatsu et al. | ................ 345/810 |
| 2007/0071212 A1 | 3/2007 | Quittek et al. | |
| 2009/0003539 A1 * | 1/2009 | Baird et al. | ................ 379/88.01 |

FOREIGN PATENT DOCUMENTS

| JP | 11-146060 | 0/5199 |
| JP | 2006-072130 A | 3/2006 |
| JP | 2006-295276 A | 10/2006 |
| JP | 2007-006467 | 1/2007 |

OTHER PUBLICATIONS

Japan Patent Office Notification of Reasons for Refusal on application 2009-270292 mailed May 21, 2013; pp. 1-4.

* cited by examiner

*Primary Examiner* — Quynh Nguyen
(74) *Attorney, Agent, or Firm* — Foley & Lardner LLP

(57) ABSTRACT

In a telephone network, an incoming call is once received using an automatic voice response. A ring tone is not played immediately after the incoming. In the automatic response, an authorization sound that is necessary every time connection to the caller is made is generated each time by superimposing a background sound on a random number generated through random number generation processing. The caller is notified of the authorization sound. A ring tone is played in response to only incoming calls that return a valid response value, and not played in response to incoming calls that return an invalid response value.

1 Claim, 25 Drawing Sheets

| 181 | 182 | 183 | 18  184 | 185 | 186 |
|---|---|---|---|---|---|
| SESSION MANAGEMENT TABLE | | | | | |
| # | INCOMING TIME | DISCONNECTION TIME | STATUS | CALLER INFORMATION | COMMENT | RANDOM NUMBER |
| 1 | 1/10/2009 11:58:28 | 1/10/2009 11:58:28 | DISCONNECTION | 045-111-2222 (user-2@A) IP4=10.0.0.2 | NO INPUT | 12-34-56 |
| 2 | 1/10/2009 12:30:15 | 1/10/2009 12:31:15 | DISCONNECTION | 03-5000-1111 (user-1@B) IP4=11.0.0.1 | NO VALID INPUT | 98-76-54 |
| 3 | 1/10/2009 13:20:18 | 1/10/2009 13:20:48 | DISCONNECTION | NO NOTIFICATION | NO INPUT WITHIN SPECIFIED TIME | 59-71-23 |
| 4 | 1/10/2009 11:34:5 | | WAIT FOR ACK | 045-111-1111 user-1@A IP4=10.0.0.1 | | |
| ⋮ | | | | | | |

FIG. 4B

| # | INCOMING TIME | DISCONNECTION TIME | STATUS | CALLER INFORMATION | COMMENT | RANDOM NUMBER |
|---|---|---|---|---|---|---|
| | 181 | 182 | 183 | 184 | 185 | 186 |
| SESSION MANAGEMENT TABLE | | | | | | |
| 4 | 1/10/2009 11:34:5 | | RANDOM NUMBER GENERATION | 045-111-1111 user-1@A IP4=10.0.0.1 | | |

FIG. 4C

| # | INCOMING TIME | DISCONNECTION TIME | STATUS | CALLER INFORMATION | COMMENT | RANDOM NUMBER |
|---|---|---|---|---|---|---|
| | 181 | 182 | 183 | 184 | 185 | 186 |
| SESSION MANAGEMENT TABLE | | | | | | |
| 4 | 1/10/2009 11:34:5 | | WAIT FOR RESPONSE | 045-111-1111 user-1@A IP4=10.0.0.1 | | 1234 |

FIG. 4D

| # | INCOMING TIME | DISCONNECTION TIME | STATUS | CALLER INFORMATION | COMMENT | RANDOM NUMBER |
|---|---|---|---|---|---|---|
| | 181 | 182 | 183 | 184 | 185 | 186 |
| SESSION MANAGEMENT TABLE | | | | | | |
| 4 | 1/10/2009 11:34:5 | | DETERMINATION IN PROCESS | 045-111-1111 user-1@A IP4=10.0.0.1 | | 1234 |

FIG. 4E

| # | INCOMING TIME | DISCONNECTION TIME | STATUS | CALLER INFORMATION | COMMENT | RANDOM NUMBER |
|---|---|---|---|---|---|---|
| 4 | 1/10/2009 11:34:5 | | CALLING | 045-111-1111 user-1@A IP4=10.0.0.1 | | 1234 |

SESSION MANAGEMENT TABLE (181), 182, 183, 184, 185, 186

FIG. 4F

| # | INCOMING TIME | DISCONNECTION TIME | STATUS | CALLER INFORMATION | COMMENT | RANDOM NUMBER |
|---|---|---|---|---|---|---|
| 4 | 1/10/2009 11:34:5 | | PHONE CALL | 045-111-1111 user-1@A IP4=10.0.0.1 | | 1234 |

SESSION MANAGEMENT TABLE

FIG. 4G

| # | INCOMING TIME | DISCONNECTION TIME | STATUS | CALLER INFORMATION | COMMENT | RANDOM NUMBER |
|---|---|---|---|---|---|---|
| 4 | 1/10/2009 11:34:5 | 1/10/2009 11:44:5 | DISCONNECTION | 045-111-1111 user-1@A IP4=10.0.0.1 | | 1234 |

SESSION MANAGEMENT TABLE

FIG. 7A

```
INVITE sip: user-2@B SIP/2.0
Via: SIP/2.0/UDP AB:5060;branch=z9hG4bKabcdef.1
Via: SIP/2.0/UDP AB:5060;branch=z9hG4bKababab
       ;received=10.0.0.1
Max-Forwards: 69
From: 045-111-1111<sip:user-1@A>;tag=qqqqqq
To: 03-5000-2222<sip:user-2@B>
Call-ID: 111111@A
CSeq: 1011 INVITE
Contact: <sip:user-1s@10.0.0.1>
Contact-type: application/sdp
Contact-Length:xxx v=0
o=user-1 2890842807 28908427 IN IP4 A
s=Voice Session
c=IN IP4 10.0.0.1
t=0 0
m=audio 50000 RTP/AVP 0
a=rtpmap:0 PCMU/8000
```

FIG. 7B

```
INVITE sip: user-2@B SIP/2.0
Via: SIP/2.0/UDP AB:5060;branch=z9hG4bKabcdef.1
Via: SIP/2.0/UDP AB:5060;branch=z9hG4bKababab
        ;received=10.0.0.1
Max-Forwards: 69
From: anonymous<sip:user-1@A>;tag=qqqqqq
To: 03-5000-2222<sip:user-2@B>
Call-ID: 111111@A
CSeq: 1011 INVITE
Contact: <sip:user-1s@10.0.0.1>
Contact-type: application/sdp
Contact-Length:xxx v=0
o=user-1 2890842807 28908427 IN IP4 A
s=Voice Session
c=IN IP4 10.0.0.1
t=0 0
m=audio 50000 RTP/AVP 0
a=rtpmap:0 PCMU/8000
```

FIG. 8

| AUTOMATIC VOICE RESPONSE TABLE | | | | | ~19 |
|---|---|---|---|---|
| MALE CHILD | FEMALE CHILD | MALE ADULT | FEMALE ADULT | BACKGROUND SOUND |
| 0 | 0 | 0 | 0 | NONE |
| 1 | 1 | 1 | 1 | WIND SOUND |
| 2 | 2 | 2 | 2 | WAVE SOUND |
| 3 | 3 | 3 | 3 | PATTERN A |
| 4 | 4 | 4 | 4 | PATTERN B |
| 5 | 5 | 5 | 5 | PATTERN C |
| 6 | 6 | 6 | 6 | PATTERN D |
| 7 | 7 | 7 | 7 | PATTERN E |
| 8 | 8 | 8 | 8 | PATTERN F |
| 9 | 9 | 9 | 9 | PATTERN G |
| 191 | 192 | 193 | 194 | 195 |

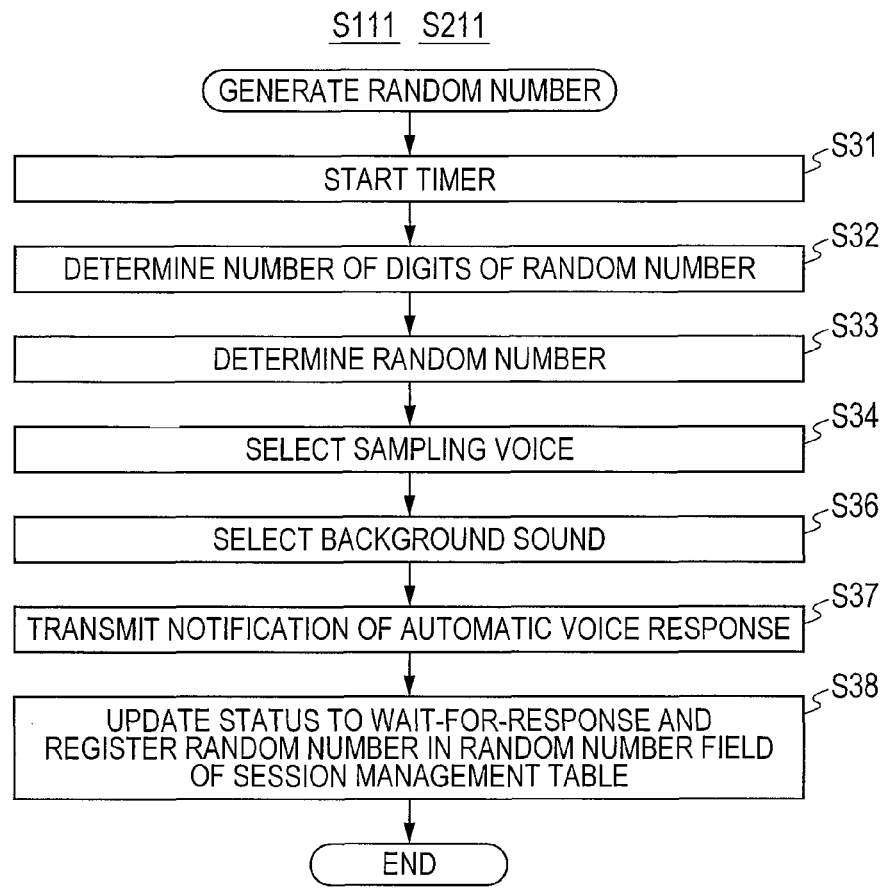

FIG. 11E
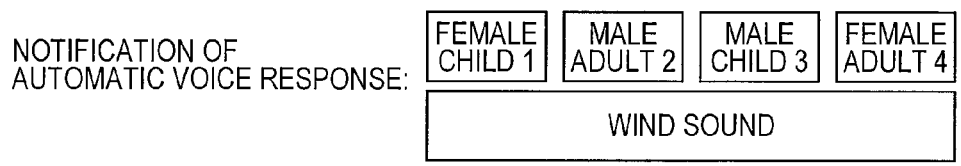
SELECT BACKGROUND SOUND: WIND SOUND
FIG. 11F
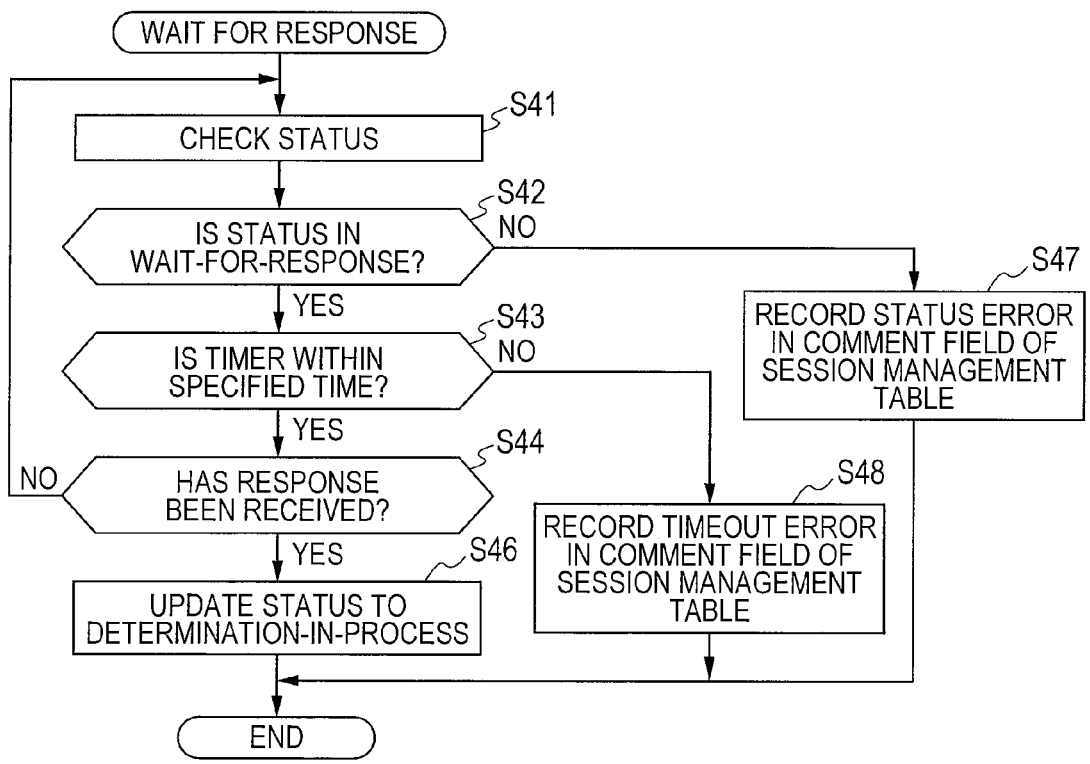
FIG. 12

FIG. 16A

FILTERING SETTING #1 — 31

| TARGET INVITE MESSAGE | SELECTION MARK | SELECTION ITEM |
|---|---|---|
| OTHER THAN SIP SERVER | | AUTHORIZATION |
| | ● | REJECTION |

FILTERING SETTING #2 — 32

| TARGET INVITE MESSAGE | SELECTION MARK | SELECTION ITEM |
|---|---|---|
| NO-NOTIFICATION | | AUTHORIZATION |
| | | REJECTION |
| | ● | RESPONSE BY RANDOM NUMBER GENERATION |

FILTERING SETTING #3 — 33

| TARGET INVITE MESSAGE | SELECTION MARK | SELECTION ITEM |
|---|---|---|
| NOTIFICATION OF NUMBER | ● | AUTHORIZATION |
| | | REJECTION |
| | | RESPONSE BY RANDOM NUMBER GENERATION |

REGISTERED-USER MANAGEMENT TABLE (30)

| # | PHONE NUMBER | SIP URI | IP ADDRESS | LIST TYPE |
|---|---|---|---|---|
| 1 | 03-5600-mmmm | user-m@B | IP6=3001:: | WHITELIST |
| 2 | 045-116-nnnn | user-n@A | IP6=2001::n | BLACKLIST |
| 3 | | | | |
| ⋮ | | | | |

FIG. 18A

SIP FRAME (70)

| CALLER ADDRESS 20.0.0.240 | CALLEE ADDRESS 11.0.0.2/24 | PORT NO. UDP | SIP INVITE MESSAGE |
|---|---|---|---|

FIG. 18B

SIP FRAME (70)

| CALLER ADDRESS 10.0.0.3/24 | CALLEE ADDRESS 11.0.0.2/24 | PORT NO. UDP | SIP INVITE MESSAGE |
|---|---|---|---|

| 181 | 182 | 183 1831 | 18 184 | 185 1851 | 186 |
|---|---|---|---|---|---|
| SESSION MANAGEMENT TABLE | | | | | |
| # | INCOMING TIME | DISCONNECTION TIME | STATUS | CALLER INFORMATION | COMMENT | RANDOM NUMBER |
| 1 | | | DISCONNECTION | | INCOMING FROM OTHER THAN SPECIFIED SERVER IP4=12.0.0.3 | |
| 2 | 1/10/2009 11:00:20 | 1/10/2009 11:00:22 | DISCONNECTION | (045-116-nnnn) (user-n@A) IP6=2001::n | INCOMING FROM BLACKLIST | |
| 3 | 1/10/2009 11:18:24 | 1/10/2009 11:28:25 | DISCONNECTION | 03-5600-mmmm (user-m@B) 3001::m | INCOMING FROM WHITELIST | |
| 4 | 1/10/2009 11:34:5 | | RANDOM NUMBER GENERATION | 045-111-1111 user-1@A IP4=10.0.0.1 | | |
| ⋮ | | | | | | |

FIG. 25B

| SESSION MANAGEMENT TABLE | | | | | | |
|---|---|---|---|---|---|---|
| # | INCOMING TIME | DISCONNECTION TIME | STATUS | CALLER INFORMATION | COMMENT | RANDOM NUMBER |
| 4 | 1/10/2009 11:34:5 | | WAIT FOR RESPONSE | 045-111-1111 user-1@A IP4=10.0.0.1 | | |

FIG. 25C

| SESSION MANAGEMENT TABLE | | | | | | |
|---|---|---|---|---|---|---|
| # | INCOMING TIME | DISCONNECTION TIME | STATUS | CALLER INFORMATION | COMMENT | RANDOM NUMBER |
| 4 | 1/10/2009 11:34:5 | | PHONE CALL | 045-111-1111 user-1@A IP4=10.0.0.1 | | |

SELECTIVE RESPONSE UNIT

CLAIM OF PRIORITY

The present application claims priority from Japanese patent application serial no. 2009-270292, filed on Nov. 27, 2009, the content of which is hereby incorporated by reference into this application.

TECHNICAL FIELD

The present invention relates to a selective response unit and particularly to a selective response unit for blocking incoming call requests from unwanted calls.

BACKGROUND OF THE INVENTION

With the spread of the Internet, IP telephone services using the Internet are being provided by telecommunications carriers and the Internet Service Providers (ISPs). Network forms in which analog and ISDN telephone lines are connected to IP networks by use of Media Gateways (MGs) are also spreading. IP telephone services provide Voice-over-IP (VoIP) communications in which voice data is transferred in Real-time Transport Protocol (RTP) packets by establishing channels (sessions) between terminals before communications start.

As a session control protocol for establishing and disconnecting sessions between terminals, Session Initiation Protocol (SIP) is defined, in which a session is controlled between terminals through an SIP server.

An SIP message includes a start line field and a header field for carrying a request or response information and a message body field for describing contents of a session. For example, a Session Description Protocol (SDP) is applied to describe contents of a session of an SIP message. In an SIP message, a communication party is identified using a request Uniform Resource Identifier (URI) described in the start line field. Additionally, in the SIP message, RTP packet communication conditions between terminals such as protocols of, e.g., a call for a callee, voice, and video and a bit rate are defined in the process of establishment of a session.

With the spread of the Internet, unwanted e-mails transmittable substantially without cost are increasing. This is problem in society. A large number of unwanted e-mails are transmitted to mail addresses collected from bulletin boards and websites on the Internet and anticipated mail addresses. This is a burden on mail servers. For example, malicious unwanted e-mails use fake source addresses.

Like these unwanted e-mails, there is a concern that a large number of unwanted calls using fake sources may be transmitted to collected and anticipated telephone numbers. In the past, unwanted calls were performed by persons. However, SPAM over IP Telephony (SPIT) using Internet Protocols (IPs) is generated by automatically running SPAM generation software by use of a computer. Basically, in IP telephone services, when a caller requests connection to a callee, a ring tone is played. Therefore, there is a possibility that SPIT may be constantly received as unwanted calls. Even when unwanted e-mails are received, the e-mails are first stored in a server and can be deleted without reading them. However, since a ring tone is played in response to each reception of an unwanted e-mail, there is a possibility that a callee may suffer from the ring tone 24 hours a day, throughout the year. Therefore, the problem of unwanted calls is more serious than that of unwanted e-mails.

Communications with IP phones are also possible via MGs over analog and ISDN telephone lines. Therefore, the same concern arises.

There are examples in which an automatic voice response is provided to prompt key inputs, e.g., for selecting services in an answer machine, a facsimile phone, and a call center. However, to provide services in these examples, predetermined keys are announced by the automatic voice response and inputs of the keys are received. Therefore, there is a possibility that the pattern may be easily learned and unwanted calls of SPIT may be received.

In JP-A No. 2007-006467, a Turing test is performed to determine whether a caller transmits an unwanted call of SPIT by providing an SPIT filter between a caller and callee. In a Turing test using the SPIT filter, the determination is performed by comparing timing of response to questions by an automatic response with an expected value of answers to the questions.

In JP-A No. 2007-006467, however, the response timing is determined using a threshold and signal energy of the response. Additionally, no clear answer to be compared is shown in the determination using an expected value of the answers. Accordingly, when ambiguous answers cause false positives, SPIT bypasses the test and is then received. Additionally, multiple answer samples for automatic determination, sampling of signal energy, etc. need a high processing ability and a large amount of memory. Further, an ambiguous answer causes a multistage test, which bothers a caller.

SUMMARY OF THE INVENTION

In the present invention, in light of the above points, when there is an incoming call, a caller is notified of a random number sound, which is difficult for machines to determine, and an automatic voice response is transmitted to the caller to prompt key inputs. Then, simple SPIT determination is achieved by comparing a random number with a response value.

According to one embodiment of the present invention, there is provided a selective response unit including a memory portion recording thereon a call control portion, a line interface portion, and an automatic voice response table, and a voice processing circuit. The call control portion includes an incoming-call authorization determination portion, a connection-disconnection determination portion, and a random number generation portion. When receiving a call connection request, the incoming-call authorization determination portion obtains a first voice corresponding to a random number generated in the random number generation portion from the automatic voice response table, and transmits the first voice from the voice processing circuit to a source of the call connection request. When the voice processing circuit does not receive a second voice corresponding to a random number within a predetermined time, the connection-disconnection determination portion transmits a call disconnection message to the source.

In the present invention, an incoming call is once received using an automatic voice response without playing a ring tone immediately after reception of the incoming call, and then a caller is notified of keys necessary for connection. The keys correspond to authorization sound by generating a random number each time, changing a different sampling voice for each digit, and overlapping a background noise with the voices. This makes it difficult for callers of SPIT to learn of the response. Only when a key response is valid, a ring tone is played; otherwise, no ring tone is played. Therefore, an incoming call in which announcement starts unilaterally is disconnected before playing a ring tone.

Impersonations of callers are often made through personal servers. Therefore, a method is also effective in which an SIP server used by a user is set in advance and incoming calls from other than the SIP server are rejected.

Further, measures to block unwanted calls by use of a whitelist of numbers of frequent callers and reliable callers and a blacklist of numbers of unwanted callers are increasing. However, in the measure to reject incoming calls of numbers of the black list, the number of URIs is infinite in IP phone and thus registration of URIs is limited. In the measure to authorize only connection with incoming calls of numbers of the whitelist, incoming calls of public institutions and public telephones are also rejected when their numbers are not registered in the whitelist.

A user can also set, e.g., the following filtering instead of receiving all incoming calls by the automatic voice response:

(1) An automatic voice response to incoming calls from numbers of a whitelist is omitted.

(2) Incoming calls from numbers of a blacklist are rejected.

(3) A response is changed based on, e.g., whether an incoming call is transmitted from other than a registered server and a notification of a number is transmitted.

The filtering is also applicable even when using Media Gateway Control Protocol (MGCP), H.248, etc. instead of SIP as a session control protocol as well as when using SIP. In the following embodiments, an IP phone terminal is explained as a selective response unit, but may be mounted, e.g., in a media gateway or a server.

In response to an incoming call, SPIT can be easily filtered out by notifying a caller of a random number to prompt key inputs by the caller.

BRIEF DESCRIPTION OF THE DRAWINGS

Preferred embodiments of the present invention will now be described in conjunction with the accompanying drawings, in which;

FIG. 4B explains the session management table (No. 2);
FIG. 4C explains the session management table (No. 3);
FIG. 4D explains the session management table (No. 4);
FIG. 4E explains the session management table (No. 5);
FIG. 4F explains the session management table (No. 6);
FIG. 4G explains the session management table (No. 7);

FIG. 7A explains an INVITE message from an SIP server;
FIG. 7B explains the INVITE message from the SIP server;

FIG. 8 explains an automatic voice response table;

FIG. 11A is a flowchart of random number generation in an IP phone terminal;

FIG. 11B explains determination of the number of digits of a random number in the random number generation;

FIG. 11C explains determination of a random number in the random number generation;

FIG. 11D explains selection of sampling voices in the random number generation;

FIG. 11E explains selection of background sounds in the random number generation;

FIG. 11F explains a notification of an automatic voice response in the random number generation;

FIG. 12 is a flowchart of wait for a response in an IP phone terminal;

FIG. 16A explains a filtering setting in an IP phone terminal to select an operation for an incoming call from other than a registered SIP server;

FIG. 16B explains the filtering setting in the IP phone terminal to select an operation for an incoming call of a number not identified;

FIG. 16C explains the filtering setting in the IP phone terminal to select an operation for an incoming call of an identified number;

FIG. 17 explains a structure of a registered-user management table;

FIG. 18 explains an SIP frame format;

FIG. 25B explains the session management table when the filtering is set (No. 2); and FIG. 25C explains the session management table when the filtering is set (No. 3).

DESCRIPTION OF PREFERRED EMBODIMENTS

Figure 1:
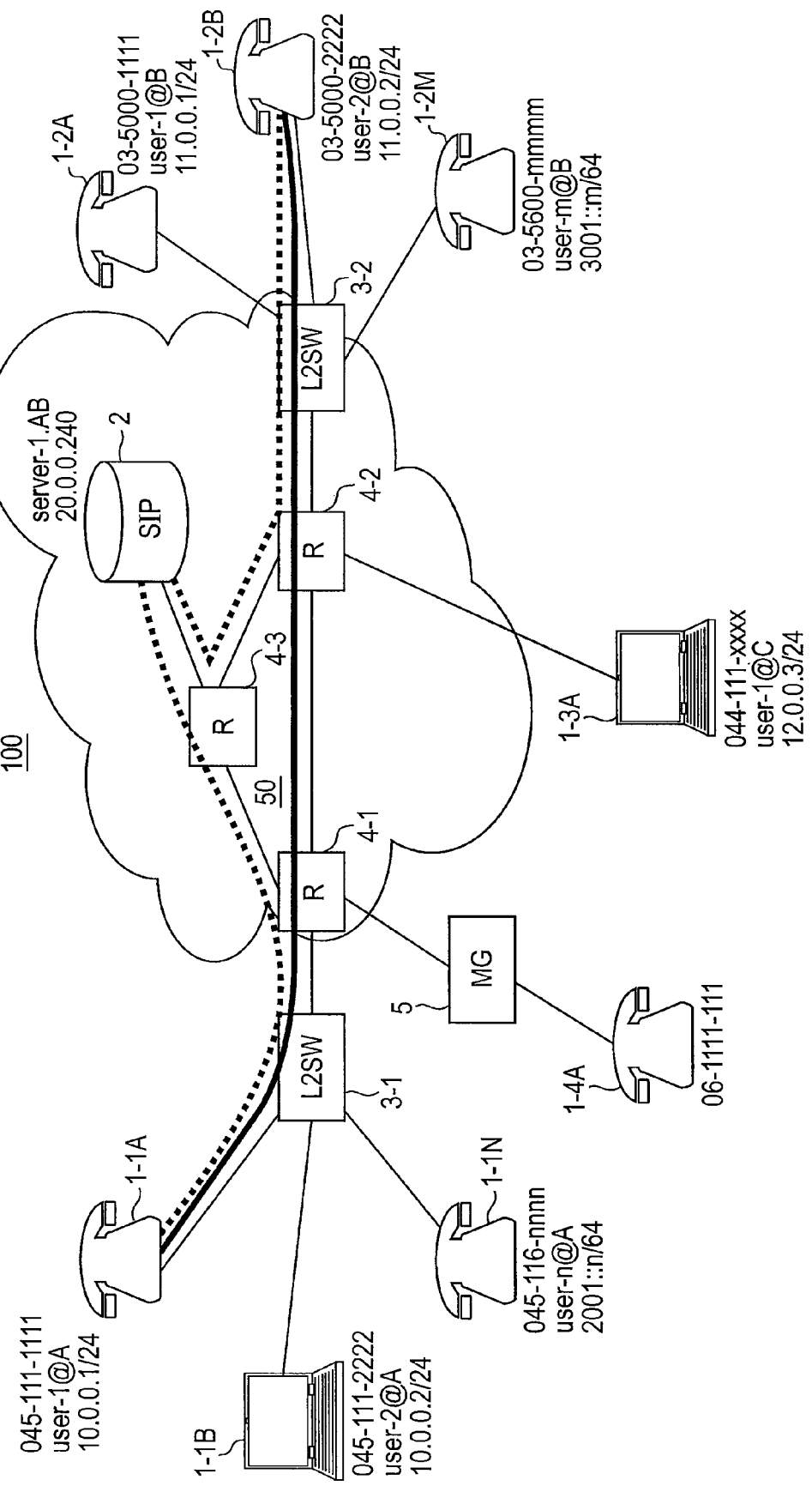
FIG. 1 is a hardware block diagram of a structure of an IP phone network.

Hereafter, embodiments of the present invention are explained in detail in reference to the appended figures. Similar reference numerals denote generally similar components, and their explanation is not repeated.

Embodiment 1

First, with reference to FIG. 1, an IP phone network 100 using a Session Initiation Protocol (SIP) as a session control protocol is explained. In FIG. 1, the IP phone network 100 includes multiple IP phone terminals 1, an SIP server (illustrated as SIP) 2, Layer-2-Switches (L2SWs) 3, three routers (illustrated as R) 4, and a Media Gateway (MG) 5. The L2SW 3-1 connects n IP phone terminals 1-1*n* (n=A to N) to the router 4-1. The L2SW 3-2 connects m IP phone terminals 1-2*m* (m=A to M) to the router 4-2. The three routers 4 form a ring type IP network 50. The router 4-1 is connected to the MG 5. The router 4-2 is connected to the IP phone terminal 1-3A. The router 4-3 is connected to the SIP server 2. The MG 5 is connected to the IP phone terminal 1-4A.

The L2SWs 3 connect the IP phone terminals 1 to the routers 4. The MG 5 connects a telephone switching network with the IP network 50.

In communications between the IP phone terminals 1, the caller IP phone terminal 1 first registers with the SIP server 2. Next, the IP phone terminal 1 controls connection by use of an SIP message through the SIP server 2 to communicate with a communication party. Communications are established between the IP phone terminals 1 after establishment of a session connection.

Figure 2:
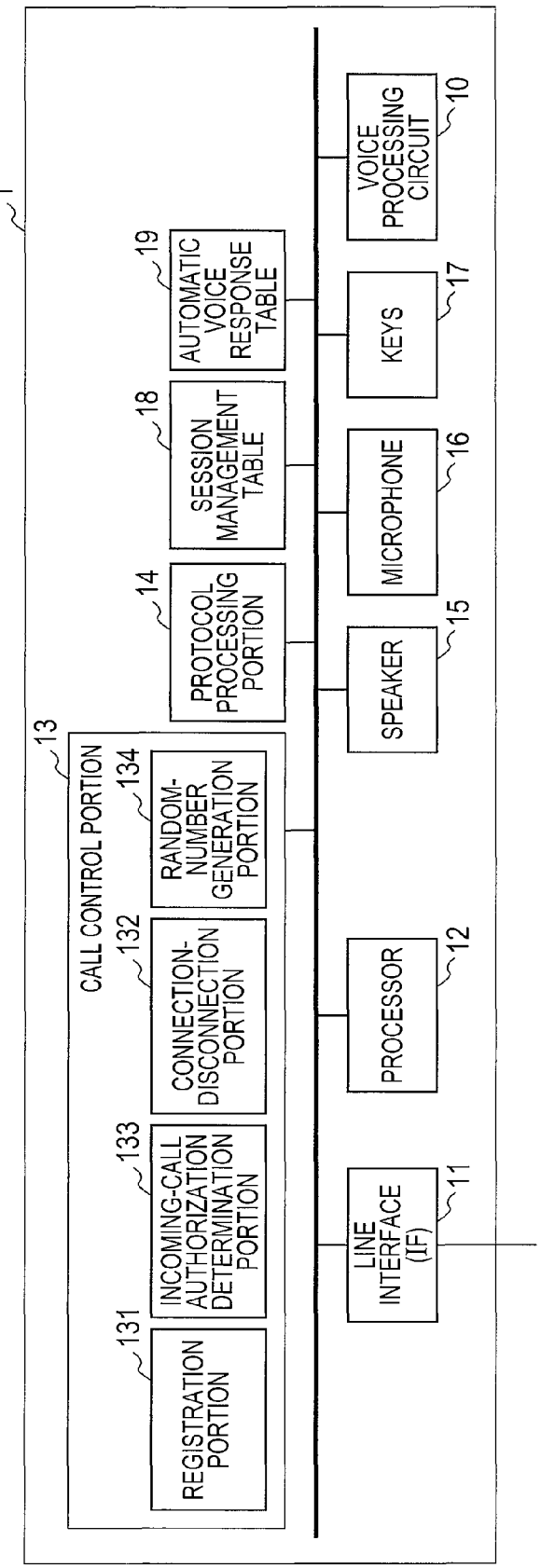
FIG. 2 is a functional block diagram of a main portion of an IP phone terminal.

With reference to FIG. 2, the main portion of the IP phone terminal 1 is explained. In FIG. 2, the IP phone terminal 1 includes a line interface (IF) 11, a processor 12, a call control portion 13, a protocol processing portion 14, a session management table 18, an automatic response voice table 19, and user interfaces including a speaker 15, a microphone 16, keys 17, and a voice processing circuit 10. The call control portion 13 includes a registration portion 131, an incoming-call authorization determination portion 133, a connection-disconnection portion 132, and a random number generation portion 134.

The connection-disconnection portion 132 performs connection and disconnection based on the incoming-call authorization determination portion 133 and information inputted using the keys 17. The connection-disconnection portion 132 records a status of a call on the session management table 18. When detecting an on-hook, the connection-disconnection portion 132 records a disconnection time on the session management table, and changes the status to disconnection. The protocol processing portion 14 decodes RTP packets received from the line IF 11. A decoded voice is outputted from the speaker 15. The protocol processing portion 14 encodes a voice inputted from the microphone 16. The line IF 11 transmits the encoded RTP packets. The random number generation portion 134 generates random numbers, and determines sampling voices and background sounds. A voice processing circuit 10 notifies a caller of a determined sampling voice and background sound. When detecting a sound of Push Button (PB), the speech processing circuit 10 converts the sound into digital data of 0-9, #, and *, and transmits them to the call control portion 13.

The registration portion 131 performs registration in the SIP server 2. The incoming-call authorization determination portion 133 determines authorization to an incoming call. The random number generation portion 134 generates random numbers.

Figures 3, 4A:
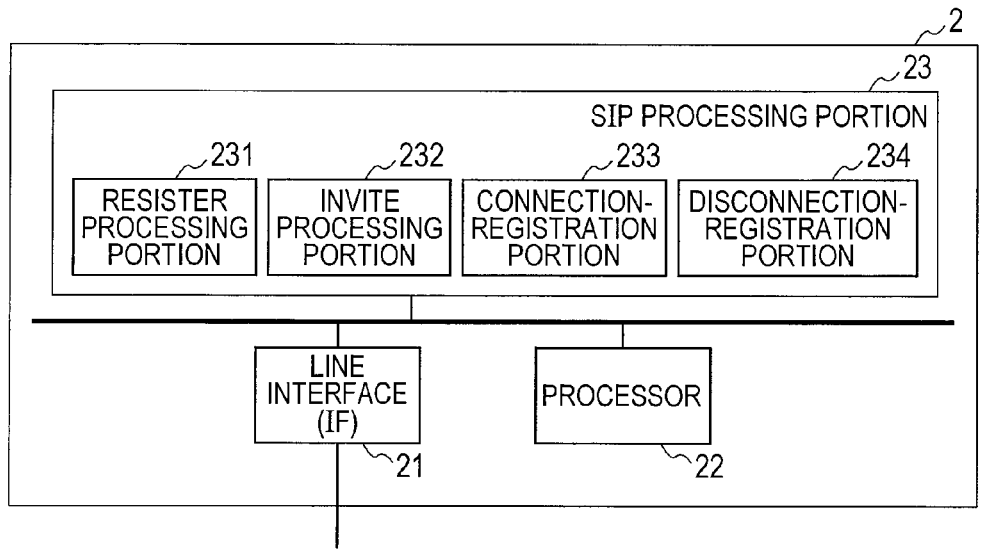
FIG. 3 is a functional block diagram of a main portion of an SIP server.
FIG. 4A explains a session management table (No. 1)

The main portion of the SIP server 2 is explained with reference to FIG. 3. In FIG. 3, the SIP server 2 includes a line IF 21, a processor 22, and an SIP processing portion 23. The SIP processing portion 23 includes a REGISTER processing portion 231, an INVITE processing portion 232, a connection-registration portion 233, and a disconnection-registration portion 234. The REGISTER processing portion 231 performs REGISTER processing. The INVITE processing portion 232 performs INVITE processing. The connection-registration portion 233 performs connection and registration processing.

The session management table 18 is explained with reference to FIGS. 4A to 4G. In FIGS. 4A to 4G, the session management table 18 includes an incoming time 181, a disconnection time 182, a status 183, caller information 184, a comment 185, and a random number 186. The session management table 18 is updated in INVITE processing, connection-registration processing, and disconnection-registration processing.

FIGS. 4A to 4G are explained in detail later.

Figure 5:
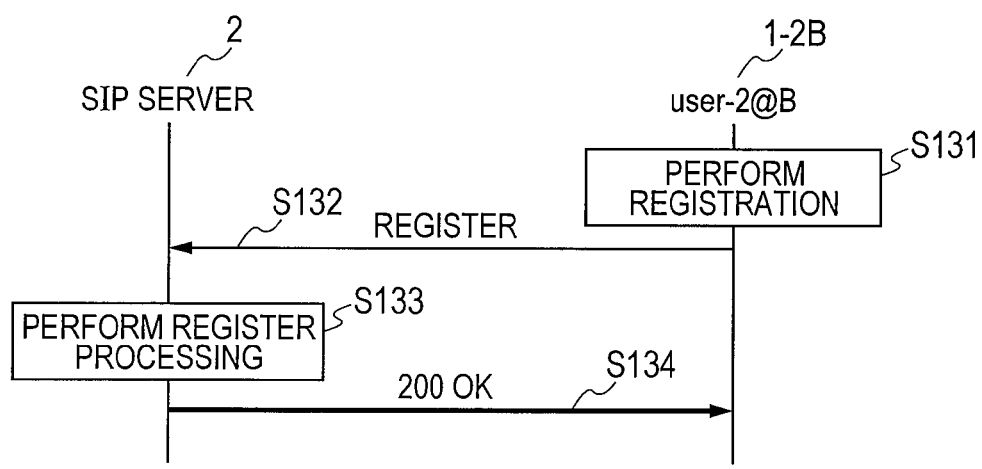
FIG. 5 is a sequence of registering IP phone terminal information in an SIP server.

With reference to FIG. 5, REGISTER of session control through the SIP server 2 to communicate between an IP phone terminal 1-1A and an IP phone terminal 1-2B is explained. In FIG. 5, for example when turned on, the IP phone terminal 1-2B performs registration to enable communications (S131). The IP phone terminal 1-2B transmits a REGISTER message to the SIP server 2 (S132). The SIP server 2 performs REGISTER processing (S133). The SIP server 2 transmits 200 OK to the IP phone terminal 1-2B (S134).

Figure 6:
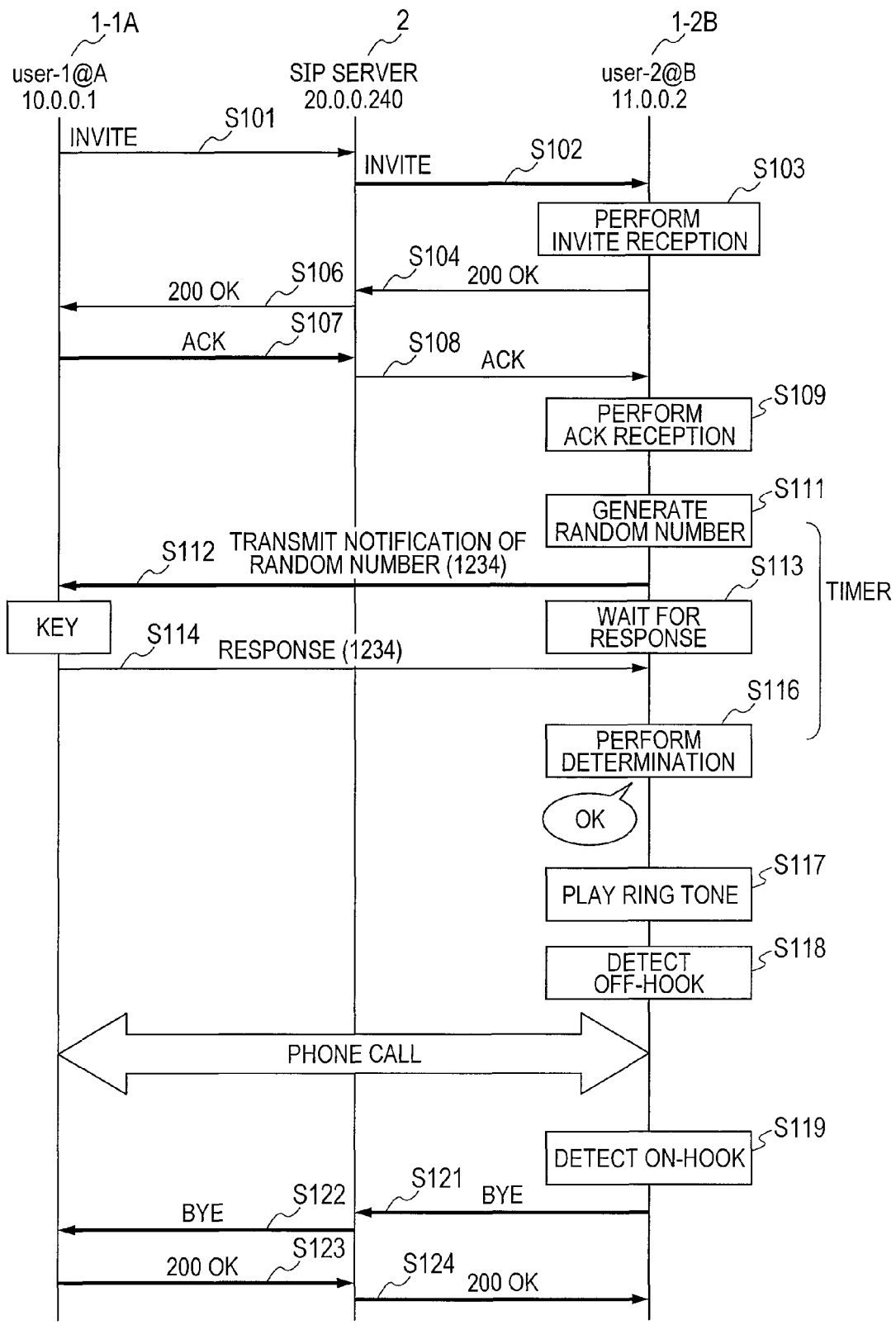
FIG. 6 is a sequence of connection, communication, and disconnection between IP phone terminals.

Next, with reference to FIG. 6, processing for an incoming call request between the IP phone terminal 1-1A and the IP phone terminal 1-2B through the SIP server 2 is explained. In FIG. 6, the IP phone terminal 1-1A transmits an INVITE message to the SIP server 2 (S101). The SIP server 2 transmits the INVITE message to the IP phone terminal 1-2B (S102). The IP phone terminal 1-2B performs INVITE reception (S103). The IP phone terminal 1-2B transmits 200 OK to the SIP server 2 (S104). The SIP server 2 transmits 200 OK to the IP phone terminal 1-1A (S106). The IP phone terminal 1-1A transmits ACK to the SIP server 2 (S107). The SIP server 2 transmits ACK to the IP phone terminal 1-2B (S108). The IP phone terminal 1-2B performs ACK reception (S109).

The IP phone terminal 1-2B performs random number generation processing (S111). The IP phone terminal 1-2B transmits a notification of a random number to the IP phone terminal 1-1A (S112). The IP phone terminal 1-2B transitions to wait for a response (S113). The IP phone terminal 1-1A receives key inputs, and transmits a response to the IP phone terminal 1-2B (S114). The IP phone terminal 1-2B performs determination (S116). Since the determination is OK here, the IP phone terminal 1-2B plays a ring tone (S117). The IP phone terminal 1-2B receives off-hook (S118). Here, the IP phone terminal 1-1A and the IP phone terminal 1-2B transition to a talk state.

The IP phone terminal 1-2B detects an on-hook (S119). The IP phone terminal 1-2B transmits BYE to the SIP server (S121). The SIP server 2 transmits BYE to the IP phone terminal 1-1A (S122). The IP phone terminal 1-1A transmits 200 OK to the SIP server 2 (S123). The SIP server 2 transmits 200 OK to the IP phone terminal 1-2B (S124).

In the INVITE reception processing (S103), when an INVITE message is received, the incoming time 181 is set to an INVITE message reception time "2009/1/10 11:34:5," the status 183 is set to "wait for ACK," the caller information is set to a telephone number "045-111-1111" and an SIP URI "user-1@A," and "IP4=10.0.0.1," and the status 183 is set to "wait for ACK" on Record 4 (#4) of the session management table 18 of FIG. 4A.

In the ACK reception processing (S109), the status 183 of #4 of the session management table 18 of FIG. 4B is updated to "random number generation." In the random number generation processing (S111), a timer which is set up arbitrarily is started, the number of digits of a random number to be transmitted is determined, and the random number is determined. In the random number generation processing, the status 183 of the session management table 18 of FIG. 4C is updated to "wait for a response," and a generated random number is stored in the random number 186. A random number is used in determination processing.

In the wait for a response (S113), wait for a response continues until expiration of the activated timer. In the determination processing, the determination of whether a PB sound of a received response matches a value described on the random number 186 is performed. Upon receiving a response, the IP phone terminal 1-2B updates the status 183 of FIG. 4D to "determination in process." Upon starting to transmit a ring tone, as shown in FIG. 4E, the IP phone terminal 1-2B updates the status 183 to "ringing." The IP phone terminal 1-2B updates the status 183 to "phone call," as shown in FIG. 4F. Upon detecting on-hook, the IP phone terminal 1-2B inputs "2009/1/10 11:44:5" in the disconnection time 182 as shown in FIG. 4G, and changes the status 183 to "disconnection."

The INVITE message of the SIP is explained with reference to FIGS. 7A and 7B. In FIGS. 7A and 7B, the INVITE message includes a request line, a Via header, a Max-Forwards header, a From header, a To header, a Call-ID header, a CSeq header, a Contact header, a Contact-type header, a Contact-Length header, and a session description using SDP. The session description includes a v-line, an o-line, an s-line, a c-line, a t-line, an m-line, and an a-line.

INVITE is described in the request line. The Via header describes information about a channel through which a request passes. The Max-Forwards header describes the maximum number of transfers and is decremented for each transfer. The From header describes a telephone number and SIP URL of a caller. The To header describes a telephone number and SIP URL of a callee. The Call-ID header describes a caller number. The CSeq header describes a sequence number and a method (INVITE in this case). The Contact header indicates a URL for direct contact. The Contact-type header describes SDP.

The v line describes a version 0 of the SDP. The o line describes a session owner and a session ID. The s line describes a session name. The c line describes connection information. The t line describes a time when a session activates. The m line is a media line and describes a sound of PCM. The a line is an attribute line.

An automatic voice response table 19 is explained with reference to FIG. 8. In FIG. 8, the automatic voice response table 19 includes, as voice sounds, male child 191, female child 192, male adult 193, female adult 194, and background sound 195. The voice sound is played to read aloud a random number. The voice sound is changed for each digit of a random number. The background sound is superimposed on the voice sounds. The background sound is changed for each notification. To prevent automatic voice recognition at an caller IP phone terminal, the voice sound is changed for each digit of a random number and the background sound is superimposed on the voice sounds.

Figure 9:
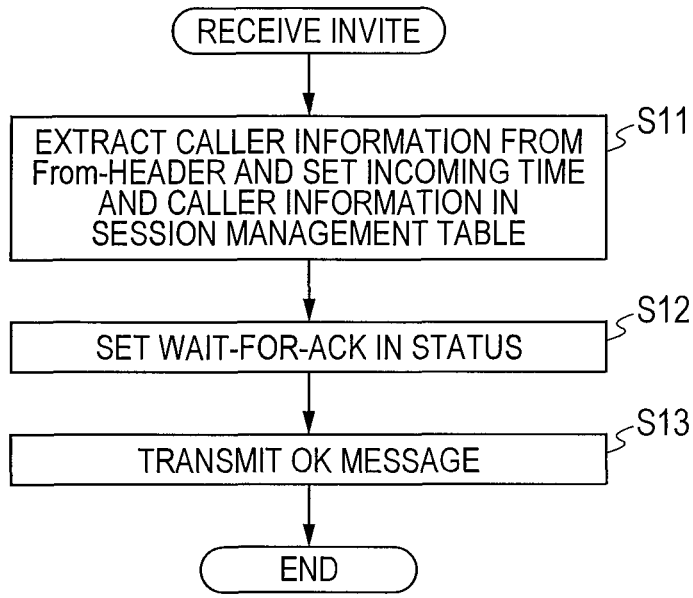
FIG. 9 is a flowchart of INVITE reception in an IP phone terminal.

With reference to FIGS. 9 to 12, processing of a callee IP phone terminal is explained in detail. First, the INVITE processing is explained with reference to FIG. 9. In FIG. 9, the IP phone terminal 1 which has received an INVITE message extracts caller information from a From line of the INVITE message, and sets the caller information 184 of the session management table 18 (S11). The IP phone terminal 1 sets the status 183 to "wait for ACK" (S12). The IP phone terminal 1 transmits an OK message to the caller IP phone terminal (S13), and ends the processing.

Figure 10:
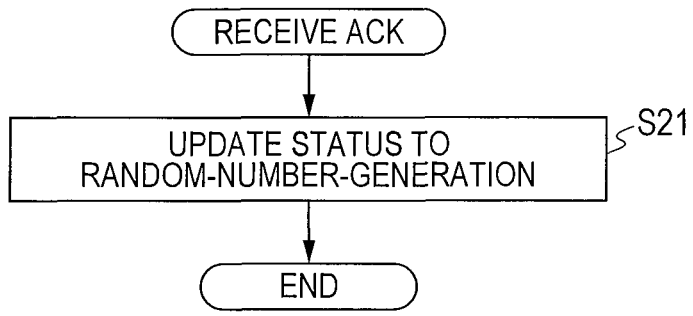
FIG. 10 is a flowchart of ACK reception in an IP phone terminal.

The ACK reception processing is explained with reference to FIG. 10. The IP phone terminal 1 which has received ACK responsive to the OK message updates the status 183 of the session management table 18 to "random number generation" (S21), and ends the ACK reception processing.

The random number generation processing is explained with reference to FIGS. 11A to 11F. In FIGS. 11A to 11F, the IP phone terminal 1 which has ended the ACK reception processing starts a timer (S31). The IP phone terminal 1 determines the number of digits of a random number (FIG. 11B, S32). The IP phone terminal 1 determines a random number (FIG. 11C, S33). The IP phone terminal 1 determines sampling sound voices (FIG. 11D, S34). The IP phone terminal 1 selects a background sound (FIG. 11E, S36). The IP phone terminal 1 superimposes the selected background sound and the random number using the selected sampling sound voices, and transmits a notification of the automatic voice response to an caller IP phone terminal (FIG. 11F: S37). The IP phone terminal 1 updates the status 183 of the session management table 18 to "wait for a response," registers the determined random number in the random number 186 (S38), and ends the processing.

The wait for a response is explained with reference to FIG. 12. In FIG. 12, the IP phone terminal 1 which has transmitted the notification of the random number checks the status 183 of the session management table 18 (S41). The IP phone terminal 1 determines whether the status 183 shows "wait for a response" (S42). The IP phone terminal 1 determines whether the timer is in within a specified time (S43). When the determination is YES, the IP phone terminal 1 determines whether the response has been received (S44). When the determination is YES, the IP phone terminal 1 updates the status 183 to "determination in process" (S46), and ends the processing.

When the determination is NO at Step 42 (S42), the IP phone terminal 1 records a status error on the comment 185 of the session management table 18 (S47), and ends the processing. When the determination is NO at Step 43, the IP phone terminal 1 records a timeout error on the comment 185 of the session management table 18 (S48), and ends the processing. When the determination is NO at Step 44, the wait processing returns to Step 41, and continues.

Figure 13:
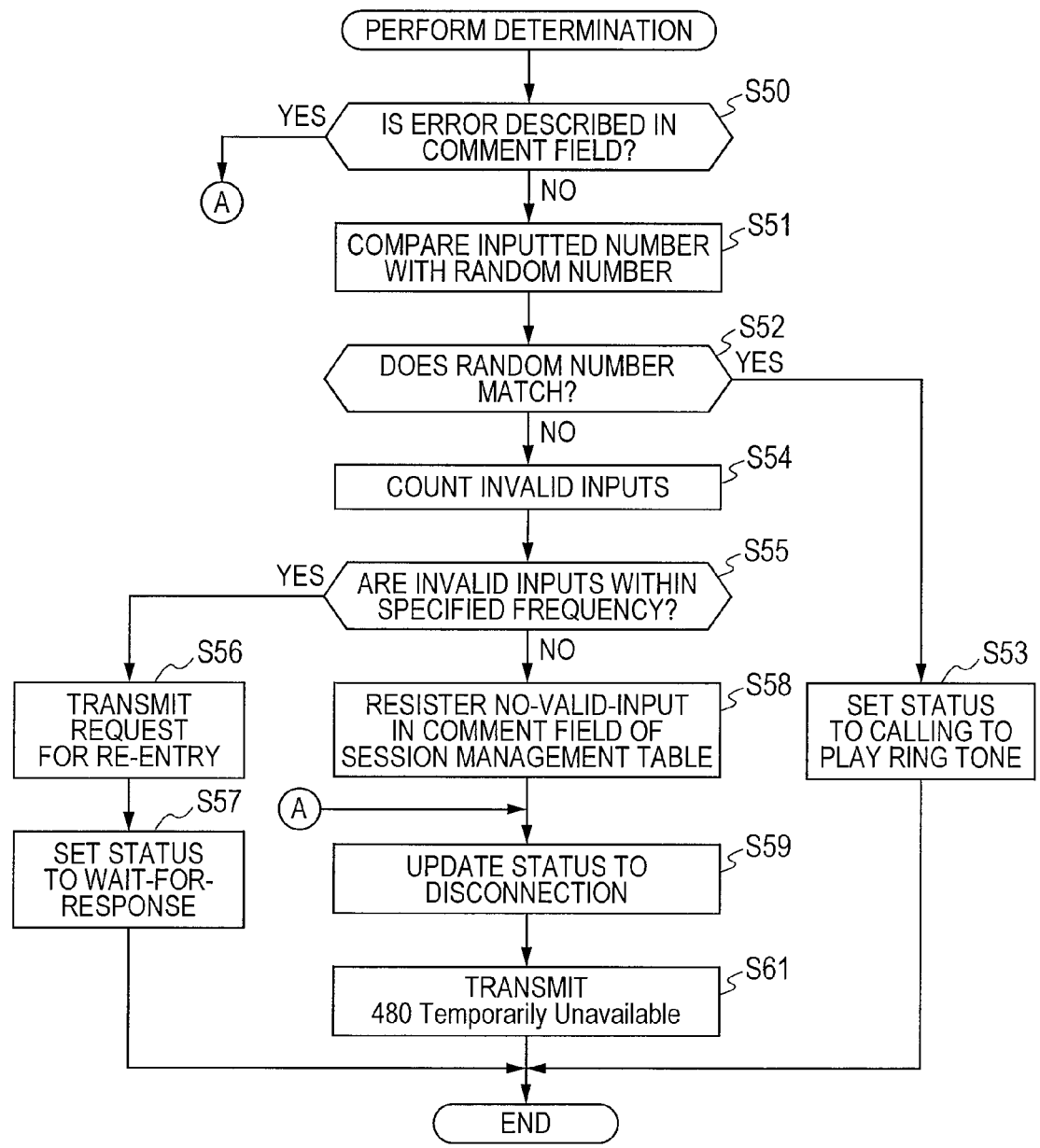
FIG. 13 is a flowchart of determination in an IP phone terminal.

The determination processing is explained with reference to FIG. 13. In FIG. 13, the IP phone terminal 1 which has received the response determines whether the comment 185 of the session management table 18 shows an error (S50). When the determination is YES, the IP phone terminal 1 transitions to Step 59 (S59) mentioned later. When the determination is NO at Step 50, the IP phone terminal 1 compares the received numerical value with the random number (S51). The IP phone terminal 1 determines whether the value and the random number match one another (S52). When the determination is YES, the IP phone terminal 1 sets the status 183 to "ringing," plays a ring tone (S53), and ends the processing. When the determination is NO at Step 52, the IP phone terminal 1 counts invalid inputs (S54). The IP phone terminal 1 determines whether a frequency of the invalid inputs is within a predetermined frequency (S55). When the determination is YES, the IP phone terminal 1 transmits a message to prompt a valid input (S56). The IP phone terminal 1 sets the status 183 to "wait for a response" (S57), and ends the processing. When the determination is NO at Step 55, the IP phone terminal 1 registers "no valid input" in the comment 185 of the session management table 18 (S58). The IP phone terminal 1 sets the status 183 to "disconnection" (S59). The IP phone terminal 1 transmits "480 Temporarily Unavailable" to the caller terminal (S61), and ends the processing.

Figure 14:
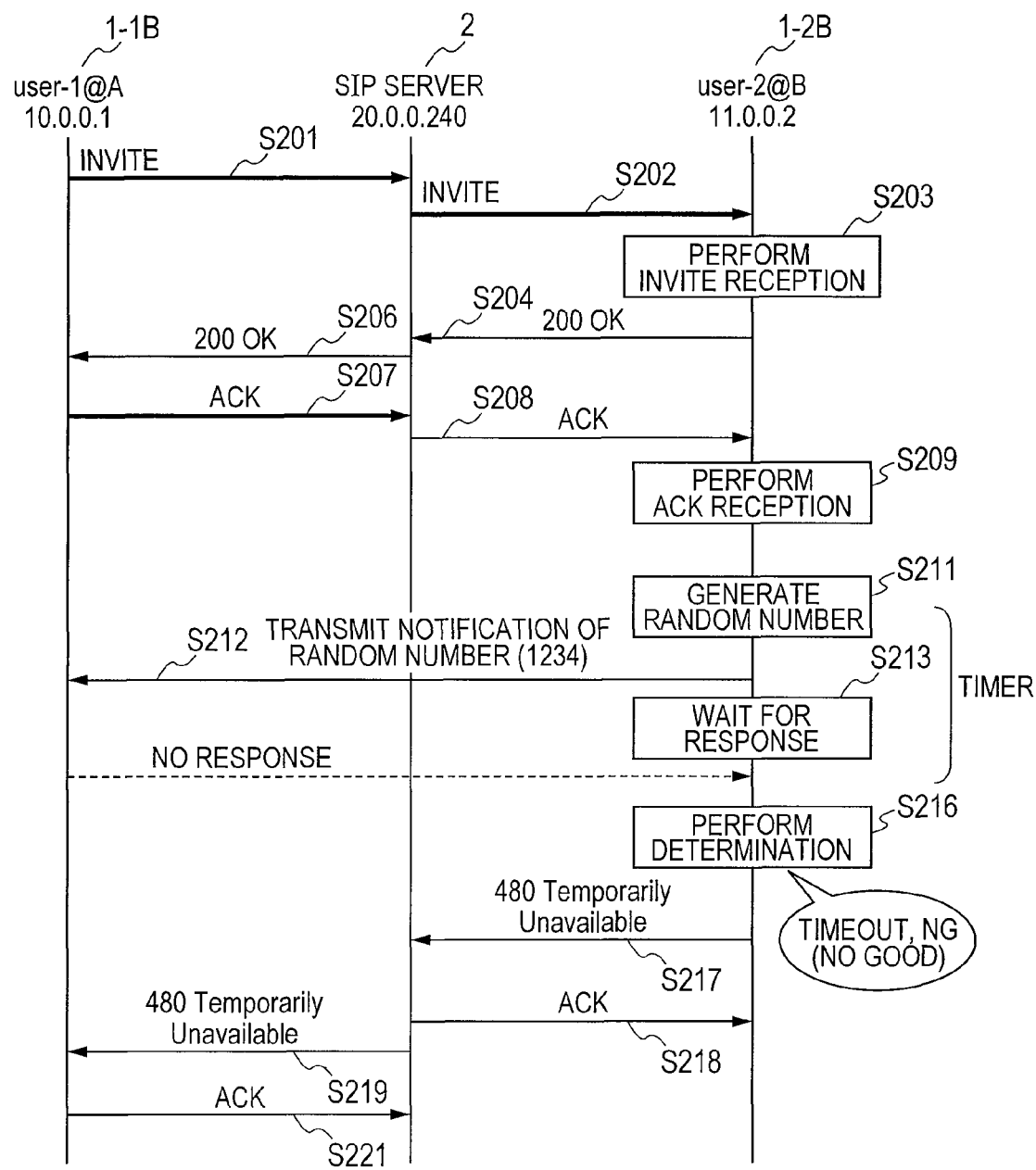
FIG. 14 is a sequence from incoming to disconnection of SPIT to and from an IP phone terminal.

Finally, with reference to FIG. 14, a processing sequence when an caller IP phone terminal transmits SPIT is explained. Here, the same IP address and SIP URI as in FIG. 6 are used. In FIG. 14, Step 201 to Step 212 are the same as Step 101 to Step 112 of FIG. 6, and are not explained.

On the other hand, it is difficult for an IP phone terminal 1-1B to respond to a notification of a random number. Therefore, the IP phone terminal 1-2B terminates at the wait for a response (S213) due to a timeout error. The IP phone terminal 1-2B determines NG in the determination processing (S216). The IP phone terminal 1-2B transmits "480 Temporarily Unavailable" to the SIP server 2 (S217). The SIP server 2 transmits ACK to the IP phone terminal 1-2B (S218). The SIP server 2 transmits "480 Temporarily Unavailable" to the IP phone terminal 1-1B (S219). The IP phone terminal 1-1B transmits ACK to the SIP server 2 (S220), and ends the processing.

Embodiment 2

In Embodiment 2, an automatic voice response is not performed in response to incoming calls registered in a previously created whitelist. Communications are blocked in response to incoming calls registered in a previously created blacklist.

Figure 15:
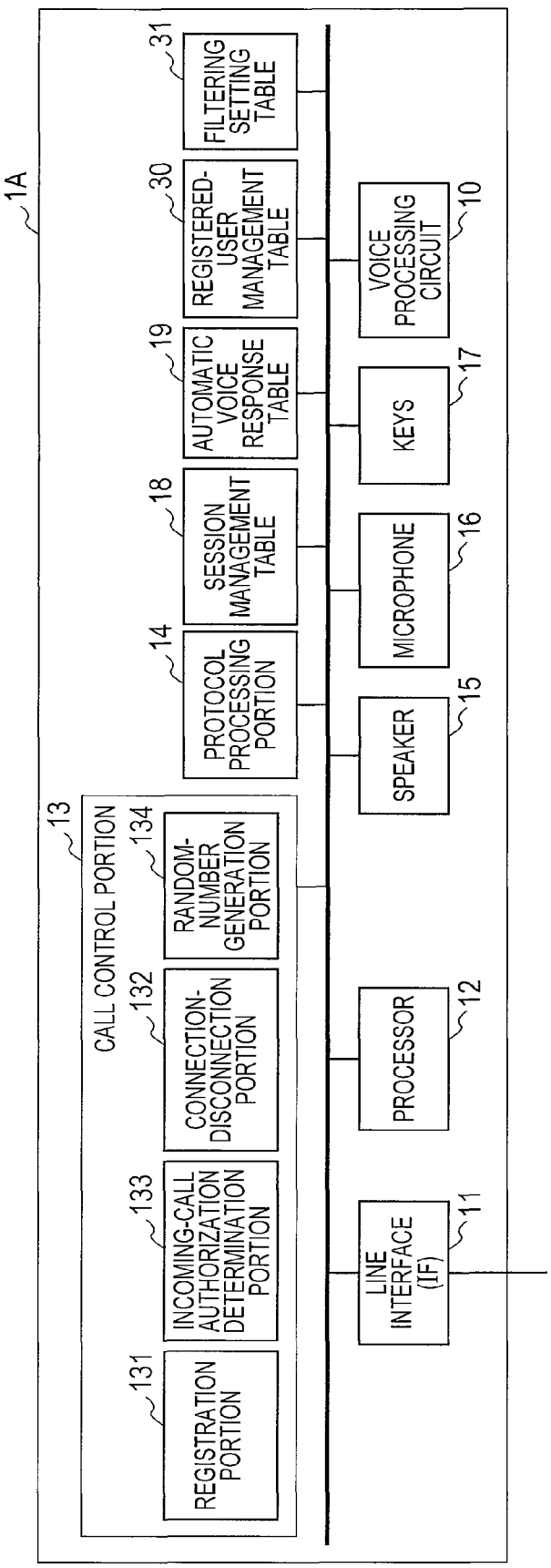
FIG. 15 is a functional block diagram of a main portion of an IP phone terminal having a filtering setting table.

With reference to FIG. 15, the main portion of an IP phone terminal 1A is explained. In FIG. 15, the IP phone terminal 1A includes the line interface (IF) 11, the processor 12, the call control portion 13, the protocol processing portion 14, the session management table 18, the automatic voice response table 19, a registered-user management table 30, a filtering setting table 31, as well as the user interfaces including the speaker 15, the microphone 16, the keys 17, and the voice processing circuit 10. The call control portion 13 includes the registration portion 131, the incoming-call authorization determination portion 133, the connection-disconnection portion 132, and the random number generation portion 134.

The IP phone terminal 1A includes the registered-user management table 30 and the filtering setting table 31 in addition to the components of the IP phone terminal 1 of FIG. 2.

With reference to FIG. 16A, a filtering setting #1 of the filtering setting table 31 is explained. The filtering setting #1 is specified by a user of the IP phone terminal 1. In FIG. 16A, the filtering setting #1 includes a target INVITE message 311, a selection mark 312, and a selection item 313. A callee sets an action in advance when there is an incoming call registered in the IP phone terminal 1. Specifically, when an INVITE message is received from an caller through other than an SIP server specified by the IP phone terminal 1, the callee selects one of authorization and rejection of the incoming call of the selection items 313. In this example, the selection mark 312 is marked on the rejection. Similarly, in a filtering setting #2 of a filtering setting table 32 of FIG. 16B, when there is an incoming call whose number is not identified, the callee selects one of authorization to, rejection of, and automatic response to the incoming call on the selection item 323. Here, a selection mark 322 has been marked on a random number generation response. Also in a filtering setting #3 of a filtering setting table 33 of FIG. 16C, when there is an incoming number-identified phone call, the callee selects one of authorization to, rejection of, and automatic response to the incoming call of selection items 333. Here, a selection mark 332 has been marked on the authorization. The determination of whether a call has been received through an SIP server is later mentioned with reference to FIG. 18. The presence of the number identification is checked with reference to the From header of FIG. 7B. In FIG. 7B, the From header shows "anonymous," not identifying a caller number.

With reference to FIG. 17, the registered-user management table 30 managing the registration of the whitelist for call authorization and the blacklist for call rejection that are set in the phone terminal 1 is explained. In FIG. 17, the registered-user management table 30 includes a record number 200, a caller's telephone number 201, an SIP URI 202, an IP address 203, and a list type 204.

The IP phone terminal 1 transmits 200 OK, receives ACK, and plays a ring tone immediately in response to an INVITE message including the telephone number 201, SIP URI 202, and IP address 203 that all match the description of the whitelist.

On the other hand, the IP phone terminal 1 transmits "480 Temporarily Unavailable" immediately in response to an INVITE message including the telephone number 201, SIP URI 202, and IP address 203 that all match the description of the blacklist.

An SIP frame format is explained with reference to FIGS. 18A and 18B. In FIGS. 18A and 18B, an SIP frame format 70 includes a source address 71, a destination address 72, a protocol and port number 73, and an SIP INVITE message 74. In FIG. 18A, the source address 71 matches an address 20.0.0.240 of an SIP server. In FIG. 18B, the source address 71 is 10.0.0.3/24, and differs from the address 20.0.0.240 of the SIP server.

Figure 19:
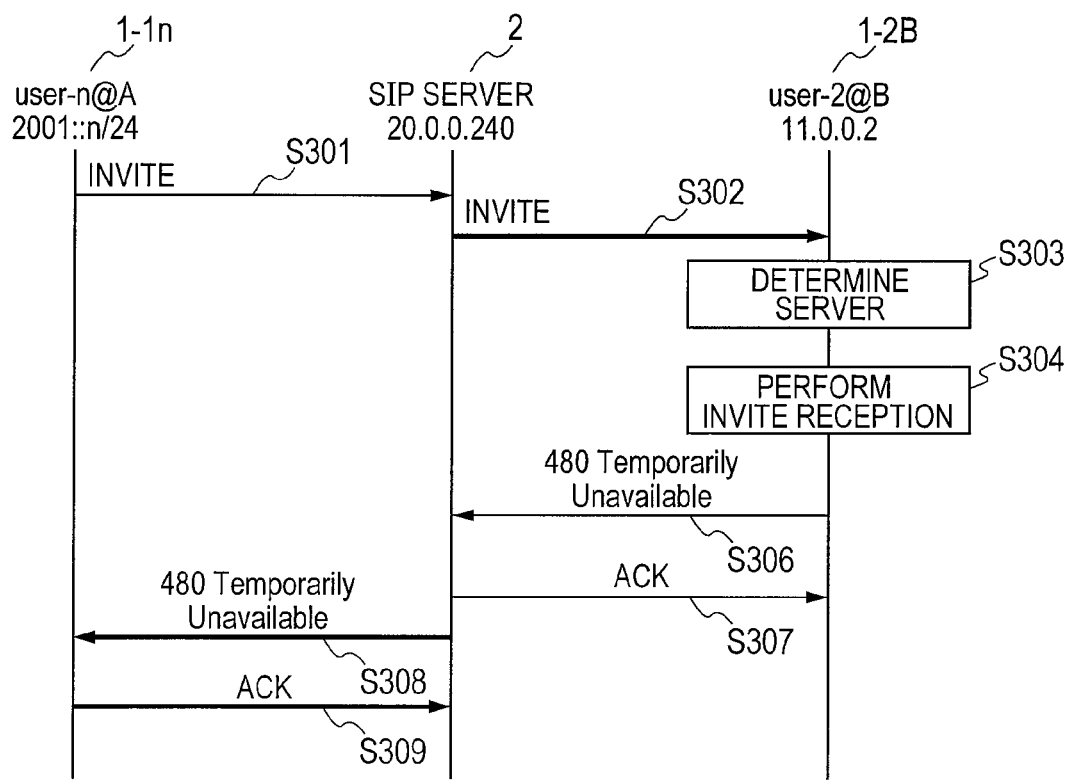
FIG. 19 is a sequence when an incoming call is received from a number registered in a blacklist.

With reference to FIG. 19, the sequence among a caller IP phone terminal registered in the blacklist, an callee IP phone terminal, and an SIP server is explained. In FIG. 19, the IP phone terminal 1-1n transmits an INVITE message to the SIP server 2 (S301). The SIP server 2 transmits the INVITE message to the IP phone terminal 1-2B (S302). The IP phone terminal 1-2B performs server determination processing (S303). The IP phone terminal 1-2B performs INVITE reception processing (S304). Here, since the IP phone terminal 1-1n is registered in the blacklist in the INVITE reception processing, the IP phone terminal 1-2B transmits "480 Temporarily Unavailable" to the SIP server 2 (S306). The SIP server 2 transmits ACK to the IP phone terminal 1-2B (S307). The SIP server 2 transmits "480 Temporarily Unavailable" to the IP phone terminal 1-1n (S308). The IP phone terminal 1-1n transmits ACK to the SIP server 2 (S309).

Figure 20:
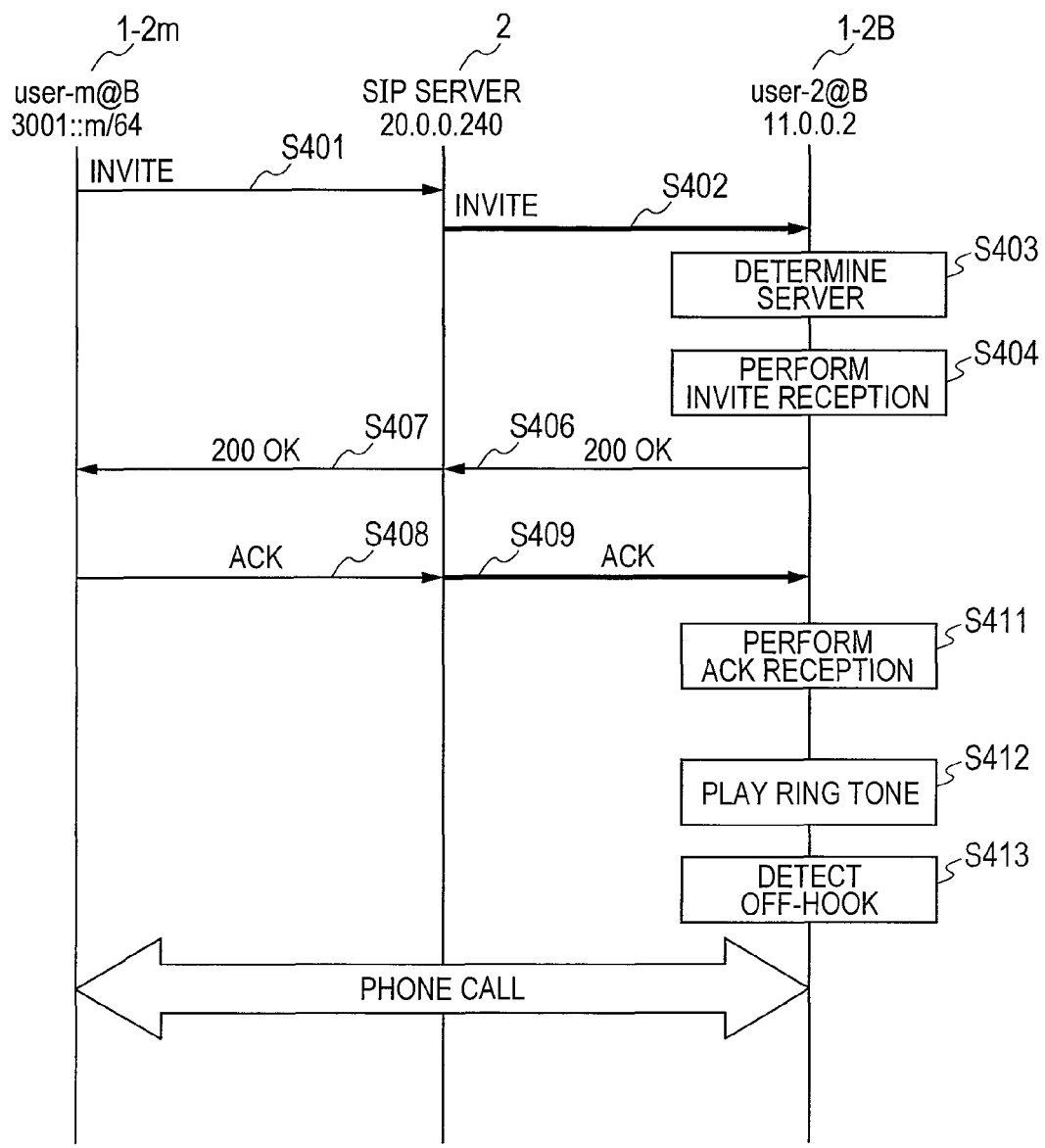
FIG. 20 is a sequence when an incoming call is received from a number registered in a whitelist.

With reference to FIG. 20, the sequence among a caller IP phone terminal registered in the whitelist, a callee IP phone terminal, and an SIP server is explained. In FIG. 20, an IP phone terminal 1-2m transmits an INVITE message to the SIP server 2 (S401). The SIP server 2 transmits the INVITE message to the IP phone terminal 1-2B (S402). The IP phone terminal 1-2B performs server determination processing (S403). The IP phone terminal 1-2B performs INVITE reception processing (S404). Here, since the IP phone terminal 1-2m has been registered in the whitelist in the INVITE reception processing, the IP phone terminal 1-2B transmits 200 OK to the SIP server 2 (S406). The SIP server 2 transmits 200 OK to the IP phone terminal 1-2m (S407). The IP phone terminal 1-2m transmits ACK to the SIP server 2 (S408). The SIP server 2 transmits ACK to the IP phone terminal 1-2B (S409). The IP phone terminal 1-2B performs ACK reception processing (S411). The IP phone terminal 1-2B plays a ring tone (S412). The IP phone terminal 1-2B detects off-hook (S413), and starts communication.

Figure 21:
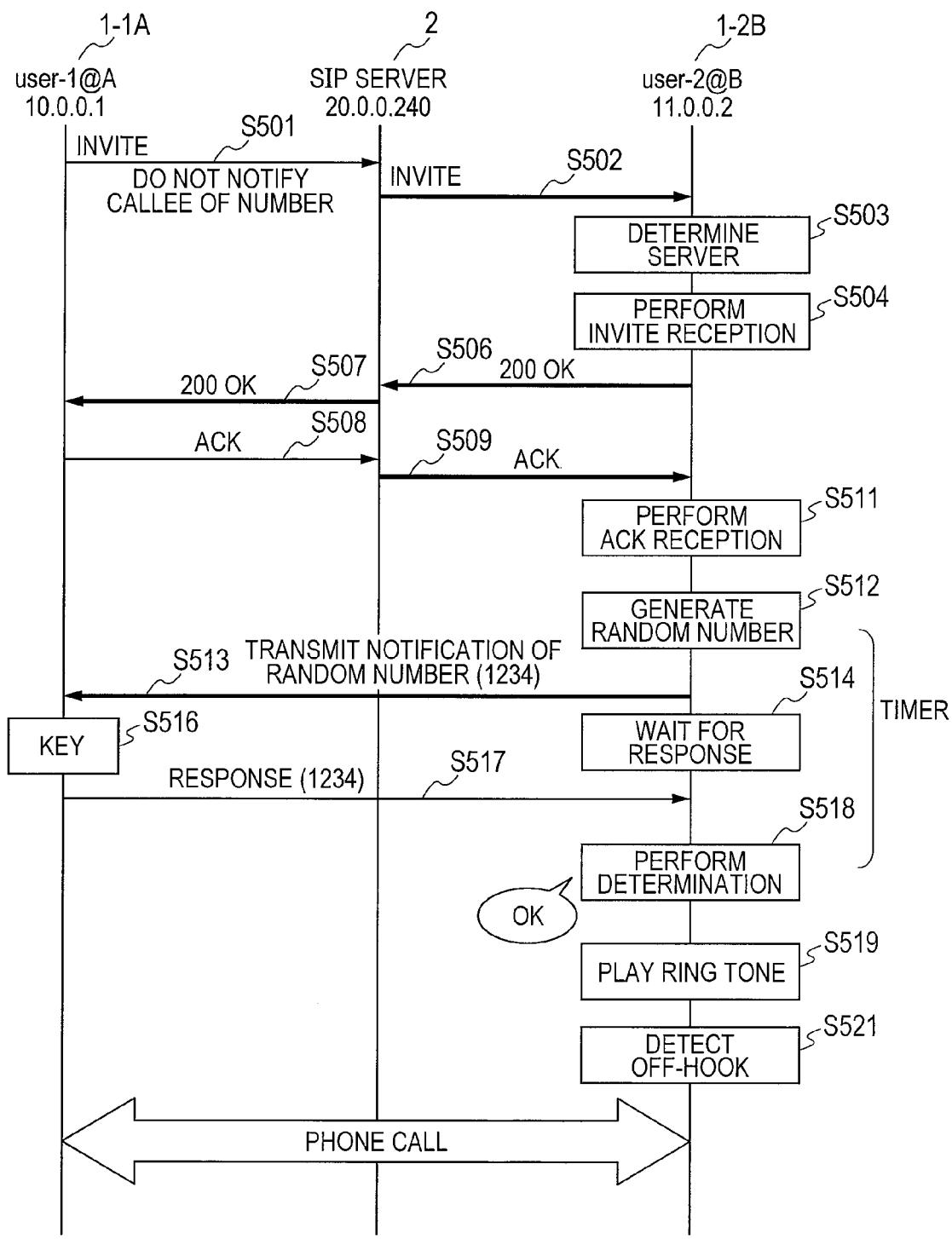
FIG. 21 is a sequence in which the random number generation is performed.

With reference to FIG. 21, the sequence among a caller IP phone terminal not registered in a whitelist/blacklist, a callee IP phone terminal, and an SIP server is explained. In FIG. 21, the IP phone terminal 1-1A transmits an INVITE message to the SIP server 2 (S501). The SIP server 2 transmits the INVITE message to the IP phone terminal 1-2B (S502). The IP phone terminal 1-2B performs server determination processing (S503). The IP phone terminal 1-2B performs INVITE reception processing (S504). Here, since the filtering setting of FIG. 16 is set such that the random number generation response is selected when a call whose number is not identified is detected in the INVITE reception processing, the IP phone terminal 1-2B transmits 200 OK to the SIP server 2 (S506). The SIP server 2 transmits 200 OK to the IP phone terminal 1-1A (S507). The IP phone terminal 1-1A transmits ACK to the SIP server (S508). The SIP server 2 transmits ACK to the IP phone terminal 1-2B (S509). The IP phone terminal 1-2B performs ACK reception processing (S511). The IP phone terminal 1-2B starts a timer, and performs random number generation processing (S512). The IP phone terminal 1-2B transmits a notification of a random number to the IP phone terminal 1-1A (S513). The IP phone terminal 1-2B starts wait for a response (S514). The IP phone terminal 1-1A receives key inputs (S516). The IP phone terminal 1-1A transmits a response of a PB signal changed from the random number to the IP phone terminal 1-2B (S517). The IP phone terminal 1-2B performs determination processing of the PB signal and the transmitted random number (S518). Here, since both match, the IP phone terminal 1-2B plays a ring tone (S519). The IP phone terminal 1-2B detects off-hook (S521), and starts communication.

Figure 22:
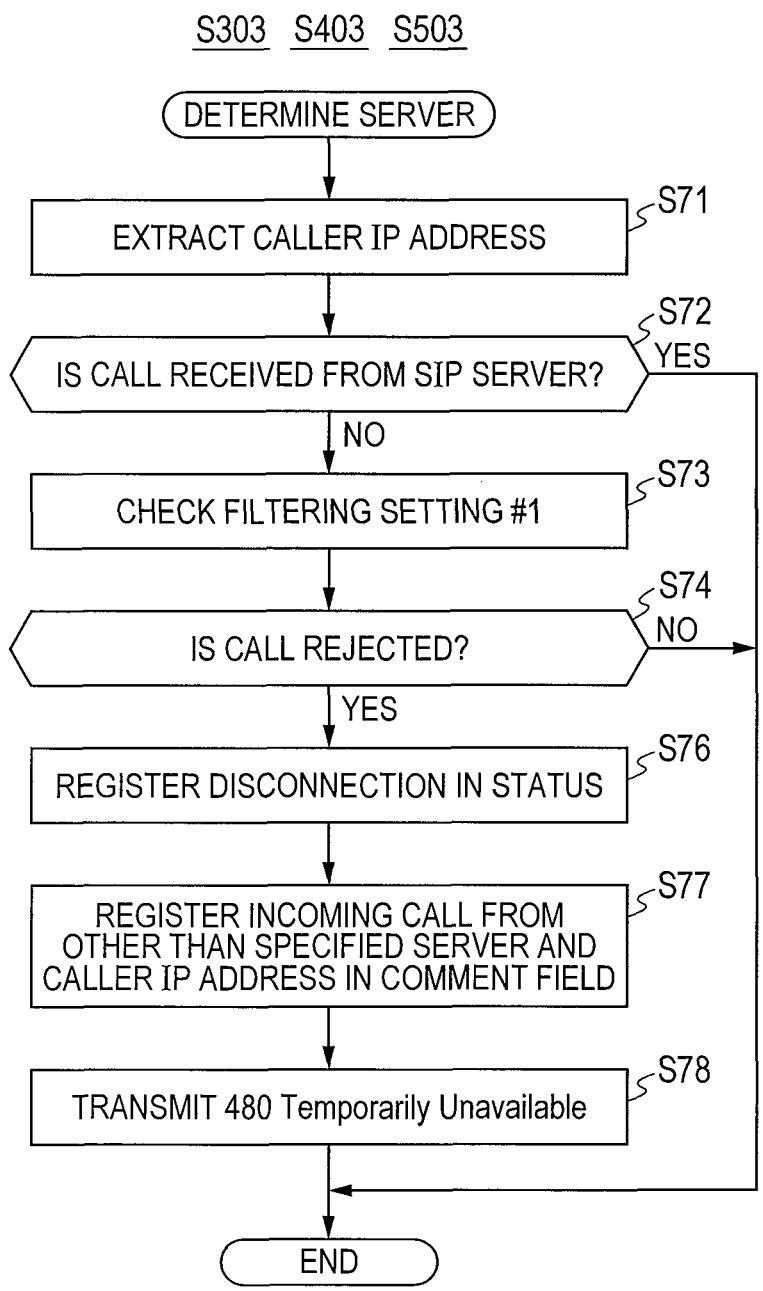
FIG. 22 is a flowchart of server determination.

The server determination processing is explained with reference to FIG. 22. In FIG. 22, the IP phone terminal 1 extracts a caller IP address (S71). The IP phone terminal 1 determines whether the reception is from an SIP server (S72). The IP phone terminal 1 checks the filtering setting when the determination is NO (S73). The IP phone terminal 1 determines whether to reject the caller (S74). The IP phone terminal 1 registers "disconnection" in the status 183 of the session management table 18 when the determination is YES (S76). The IP phone terminal 1 records "reception from other than a specified server," and the caller IP address on the comment 185 of the session management table 18 (S77). The IP phone terminal 1 transmits "480 Temporarily Unavailable" to the caller IP phone terminal (S78), and ends the processing. The IP phone terminal 1 ends the server determination processing when the determination is YES at Step 72 and NO at Step 74.

Figure 23:
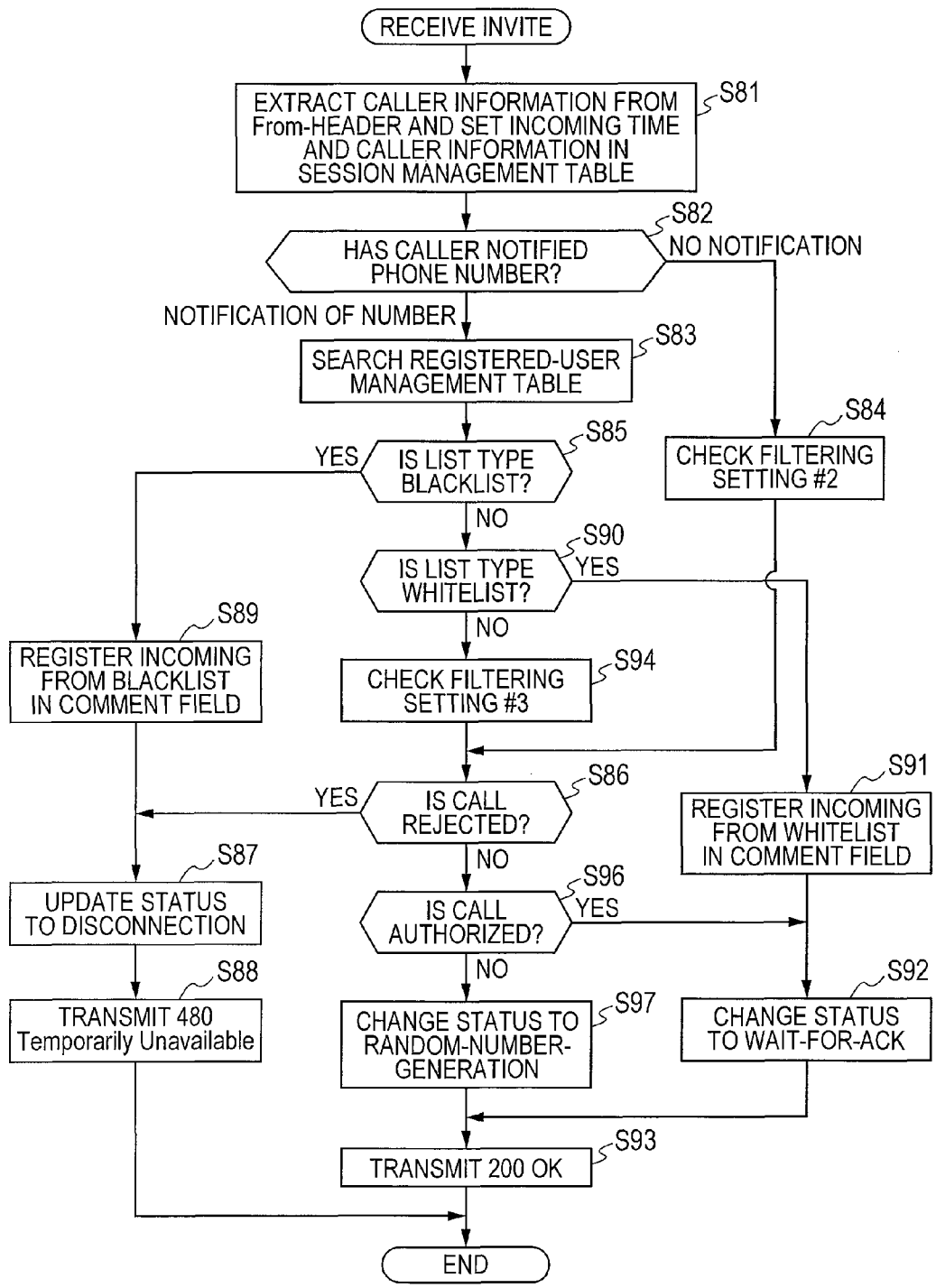
FIG. 23 is a flowchart of the INVITE reception.

The INVITE reception processing is explained with reference to FIG. 23. In FIG. 23, the IP phone terminal 1 extracts caller information from the From header, and registers the caller information in the session management table 18 (S81). The IP phone terminal 1 determines whether a caller phone number is notified (S82). The IP phone terminal 1 checks filtering setting #2 when the caller phone number is not notified (S84). The IP phone terminal 1 determines whether to reject the caller (S86). The IP phone terminal 1 updates the status to "disconnection" when the determination is YES (S87). The IP phone terminal 1 transmits "480 Temporarily Unavailable" (S88), and ends the processing.

The IP phone terminal 1 searches for the registered-user management table 30 when the caller phone number is notified at Step 82 (S83). The IP phone terminal 1 determines whether the list type for the number is the blacklist (S85). When the determination is YES, the IP phone terminal 1 registers in the remark "reception from the caller in the blacklist" (S89), and transitions to Step 87.

When the determination is NO at Step 85, the IP phone terminal 1 determines whether the list type for the number is the whitelist (S90). When the determination is YES, the IP phone terminal 1 registers in the remark field "reception from the caller in the whitelist" (S91). The IP phone terminal 1 sets the status to "wait for ACK" (S92). The IP phone terminal 1 transmits OK (S93), and ends the processing.

The IP phone terminal 1 checks the filtering #3 when the determination is NO at Step 90 (S94). The IP phone terminal 1 determines whether to reject the caller (S86). The IP phone terminal 1 transitions to Step 87 when the determination is YES. The IP phone terminal 1 determines whether to authorize the caller at Step 86 when the determination is NO (S96). When the determination is NO, the IP phone terminal 1 changes the status to "random number generation" (S97), and transitions to Step 93. The IP phone terminal 1 transitions to Step 92 when the determination is YES at Step 96.

Figures 24, 25A:
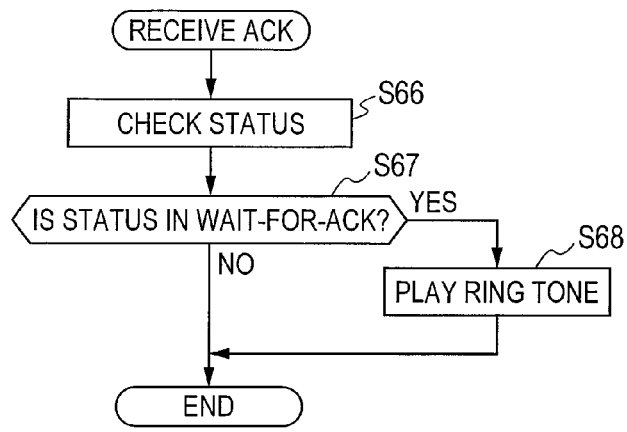
FIG. 24 is a flowchart of the ACK reception.
FIG. 25A explains a session management table when filtering is set (No. 1)

The ACK reception processing is explained with reference to FIG. 24. In FIG. 24, the IP phone terminal 1 checks the status (S66). The IP phone terminal 1 determines whether the status shows wait for ACK (S67). When the determination is YES, the IP phone terminal 1 plays a ring tone (S68), and ends the processing. The IP phone terminal 1 ends the processing without change when the determination is NO at Step 67.

With reference to FIGS. 25A to 25C, transition of the session management table when setting the filtering is explained. In FIG. 25A, Record of #1 shows a result of the server determination processing after receiving an INVITE message from other than an SIP server. Because the INVITE message has been determined to be received from other than a server registered in the IP phone terminal 1 in the server determination processing, "disconnection" has been registered in the status, and "incoming call from other than an SIP server" and the caller IP address have been registered in the comment field. Record of #2 shows a result of the INVITE reception processing after receiving an INVITE message from a caller in the blacklist. An incoming time and caller information have been registered in the INVITE reception processing. Further, since the caller has been registered in the blacklist, "disconnection" has been registered in the status and "incoming call from the caller in the blacklist" has been registered in the comment field. Record #3 shows a result of the following processing: reception of the INVITE message from a caller in the whitelist; registration of an incoming time and caller information in the INVITE reception processing; registration of "incoming call from a caller in the whitelist" in the comment field because the caller has been registered in the whitelist; communication after registering wait for ACK in the status; and registration of a disconnection time and registration of "disconnection" in the status after the communication. Record #4 shows a result of the INVITE reception processing after receiving the INVITE message from other than callers of the white/blacklist. An incoming time and caller information have been registered at the time of INVITE reception processing, and further, since a number of this incoming call has not been identified, "random number generation" has been registered in the status based on the filtering setting #2. As shown in FIG. 25B, on Record #4, the status is changed to "wait for a response" and a random number is registered after the ACK reception and random number generation processing. Then, the status is changed to "ringing" after wait for a response and determination processing, and a ring tone is played. As shown in FIG. 25C, when off-hook is detected, the status is set to "phone call."

What is claimed is:

1. A selective response unit used for IP telephone services comprising:
 a call control portion;
 a line interface portion;
 a memory portion recording thereon an automatic voice response table; and
 a voice processing circuit;
 wherein
  the call control portion includes an incoming-call authorization determination portion, a connection-disconnection determination portion, and a random number generation portion;
  the incoming-call authorization determination portion, when receiving a call connection request, is configured to obtain a first voice corresponding to a random number generated in the random number generation portion from the automatic voice response table, and to transmit the first voice from the voice processing circuit to a source of the call connection request;
  the connection-disconnection determination portion, when the voice processing circuit does not receive a number equal to the random number from the source within a predetermined time, is configured to transmit a call disconnection message to the source;

the memory portion is further configured to record thereon a registered-user management table and a filtering setting table; and the incoming-call authorization determination portion, when receiving a call connection request, is configured to select any one of transmission of the first voice, transfer of a call connection request or transmission of an incoming call signal, and transmission of a call disconnection message based on the registered-user management table and the filtering setting table.

* * * * *